R. R. MOORE.
Feeders for Thrashing-Machines.
No. 198,995. Patented Jan. 8, 1878.
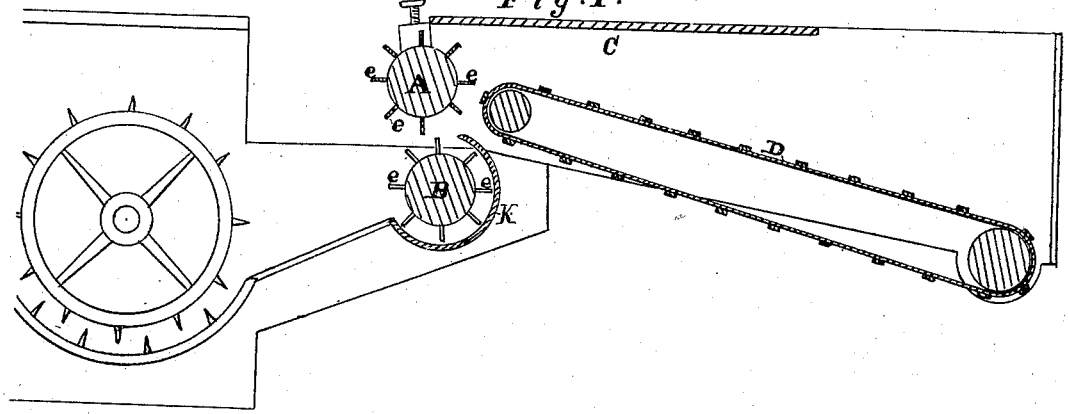
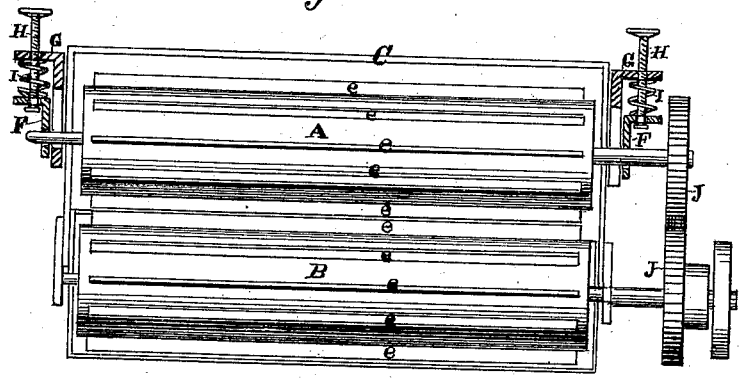
Witnesses
Geo. H. Strong.
Olwyn T. Stacy.
Inventor
Rufus R. Moore
By Dewey & Co.
Attys.

UNITED STATES PATENT OFFICE.

RUFUS R. MOORE, OF MODESTO, CALIFORNIA.

IMPROVEMENT IN FEEDERS FOR THRASHING-MACHINES.

Specification forming part of Letters Patent No. 198,995, dated January 8, 1878; application filed June 8, 1877.

*To all whom it may concern:*

Be it known that I, RUFUS R. MOORE, of Modesto, county of Stanislaus, and State of California, have invented an Improved Feeder for Thrashing-Machines; and I do hereby declare the following to be a full, clear, and exact description thereof, reference being had to the accompanying drawings.

My invention relates to certain improvements in apparatus for feeding unthrashed straw to the thrashing-machine cylinder, and by its use the straw is delivered to the cylinder in a regular flow, which is necessary to good work. If the straw arrive at the feeder in bunches, it is held back in such a manner as to be fed in gradually, and is prevented from slugging through the thrasher in an unthrashed condition.

My invention consists in the use of two cylinders or rollers, which are mounted at the mouth of the machine, and are driven slowly by suitable connections from the machine, in combination with a concave, for a purpose hereinafter fully described. These rollers have bars or flutings extending from end to end, and they receive the straw from a properly-arranged carrying-belt, which delivers it between them. The cylinders feed it forward slowly, and the thrashing-cylinder seizes and drags it away as rapidly as may be needed. The rollers are made adjustable to or from each other, to protect them from injury by foreign substances, or to admit masses of straw.

In the accompanying drawings, Figure 1 is a longitudinal section of my feeding device, showing its attachment to the thrashing-machine. Fig. 2 is a view of the rollers and their driving-gear.

A and B are two cylinders or rollers, which are suitably mounted at the throat of the machine, so as to discharge the straw fed by them to the thrashing-cylinder. In the present case I have shown these rollers as mounted at the front of a box or frame, C, and this frame may be supported on or hinged to the thrashing-machine adjustably, so that its rear end can be raised or lowered for convenience in receiving straw upon the carrying-belt D. This belt is mounted in the frame C, and driven by suitably-arranged pulleys, so that straw which is pitched upon its rear end will be carried to the front and fed to the rollers.

The rollers A B are provided with fluted ribs or bars e e, which extend from end to end of each, and the rollers are made adjustable to or from each other; or they may be set at any desired point, so as to leave a feed-opening to suit the capacity of the thrashing-machine.

In the present case I have shown the lower roller stationary, while the upper one has journals turning in movable boxes F. These boxes slide in guides G, so as to approach to or move away from the lower roller, and they may be operated by screws H; or springs I may be employed to hold the upper roller, but allow it to recede if too large a bunch of straw presents itself, or for a foreign substance.

When constructed in this manner it will be seen that if any substance should pass between the rollers large enough to endanger the thrashing-machine, the rollers would be forced apart so far that the driving-gears J J would be thrown out of contact, and the feeding would cease until the machine was relieved.

If desired, a system of intermediate gears with connecting-levers could be employed, such as are used upon planers and some washing and wringing machines, so that an unlimited adjustment might be had.

A concave case, K, fits closely to the lower roller, so that any straw which may be carried around will be again carried between the rollers, and no clogging will occur.

The principle of operation of my machine is to combine slow motion of the rollers A B with the rapid motion of the thrashing-cylinder, so that the latter will seize the straw as it emerges from between the rollers, and drag it into the thrashing-concave.

It will be seen that, by the use of this system of rollers, the rollers will hold it while the thrashing-cylinder tears or drags away just as much of the mass as it can properly dispose of, while any method which contemplates the distribution of the straw upon a feeding-belt will be inoperative, because one end of the mass must be held in some manner in order to allow it to be properly separated, as is done by my machine.

Various methods of attaching the feeder to the thrashing-machine may be employed; but the simplest will be to extend a bar across near the throat, and allow the feeder-frame to rest upon it by means of hooks or notches.

Having thus described my invention, what I claim, and desire to secure by Letters Patent, is—

The rollers A B, adjustably mounted in the throat of the thrashing-machine, and provided with the fluted ribs or bars e e, for feeding and regulating the supply of straw to the thrashing-cylinder, in combination with the concave K, the several parts constructed and relatively arranged substantially as herein described.

In witness whereof I have hereunto set my hand and seal.

R. R. MOORE. [L. S.]

Witnesses:
GEO. H. STRONG,
FRANK A. BROOKS.